(12) United States Patent
Donet et al.

(10) Patent No.: US 10,408,109 B2
(45) Date of Patent: Sep. 10, 2019

(54) DEVICE FOR CATALYTIC CONVERSION HAVING A REDUCED ACTIVATION TIME

(71) Applicant: COMMISSARIAT A L'ENERGIE ATOMIQUE ET AUX ENERGIES ALTERNATIVES, Paris (FR)

(72) Inventors: Sebastien Donet, Meaudre (FR); Aurelie Vandeneynde, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 72 days.

(21) Appl. No.: 15/517,560

(22) PCT Filed: Oct. 8, 2015

(86) PCT No.: PCT/EP2015/073312
§ 371 (c)(1),
(2) Date: Apr. 7, 2017

(87) PCT Pub. No.: WO2016/055596
PCT Pub. Date: Apr. 14, 2016

(65) Prior Publication Data
US 2018/0223714 A1    Aug. 9, 2018

(30) Foreign Application Priority Data

Oct. 10, 2014    (FR) .................................... 14 59732

(51) Int. Cl.
*F01N 3/28*    (2006.01)
*B01D 53/94*    (2006.01)
(Continued)

(52) U.S. Cl.
CPC ......... *F01N 3/2828* (2013.01); *B01D 53/944* (2013.01); *B01D 53/945* (2013.01);
(Continued)

(58) Field of Classification Search
CPC ....... F01N 3/2828; F01N 3/10; B01D 53/944; B01D 53/945; B01J 21/16; B01J 23/40;
(Continued)

(56) References Cited

U.S. PATENT DOCUMENTS 6,986,247 B1    1/2006  Parise
7,250,385 B1    7/2007  Ohno et al.
(Continued)

FOREIGN PATENT DOCUMENTS

EP    1 243 335 A1    9/2002
JP    01085604 A  *  3/1989
(Continued)

OTHER PUBLICATIONS

U.S. Appl. No. 14/375,545, filed Jul. 30, 2014, US 2014/0377650 A1, Pascal Tiquet et al.
(Continued)

*Primary Examiner* — Audrey K Bradley
*Assistant Examiner* — Kelsey L Stanek
(74) *Attorney, Agent, or Firm* — Oblon, McClelland, Maier & Neustadt, L.L.P.

(57) ABSTRACT

A device for catalytic conversion of NOx to 8 and/or of CO to CO2, including: a ceramic support including at least a plurality of channels; a thermal barrier made of thermal insulating material covering at least one part of the internal surface of the channels; porous SiC at least partially covering the thermal barrier such that the SiC is separated from the support by the thermal barrier; one or more conversion catalysts at least on the SiC.

15 Claims, 1 Drawing Sheet

(51) Int. Cl.

| | | |
|---|---|---|
| *B01J 37/02* | (2006.01) | |
| *B01J 35/04* | (2006.01) | |
| *F01N 3/10* | (2006.01) | |
| *B01J 23/40* | (2006.01) | |
| *B01J 23/63* | (2006.01) | |
| *B01J 27/224* | (2006.01) | |
| *B01J 21/16* | (2006.01) | |
| *B01J 23/42* | (2006.01) | |
| *B01J 23/44* | (2006.01) | |
| *B01J 23/46* | (2006.01) | |
| *B01J 23/50* | (2006.01) | |
| *B01J 37/08* | (2006.01) | |
| *F01N 13/14* | (2010.01) | |

(52) U.S. Cl.
CPC ............... *B01J 21/16* (2013.01); *B01J 23/40* (2013.01); *B01J 23/42* (2013.01); *B01J 23/44* (2013.01); *B01J 23/464* (2013.01); *B01J 23/50* (2013.01); *B01J 23/63* (2013.01); *B01J 27/224* (2013.01); *B01J 35/04* (2013.01); *B01J 37/0228* (2013.01); *B01J 37/0238* (2013.01); *B01J 37/0244* (2013.01); *B01J 37/08* (2013.01); *F01N 3/10* (2013.01); *F01N 13/14* (2013.01); *B01D 2255/104* (2013.01); *B01D 2255/1021* (2013.01); *B01D 2255/1023* (2013.01); *B01D 2255/1025* (2013.01); *B01D 2255/9022* (2013.01); *B01D 2255/9025* (2013.01); *F01N 2330/06* (2013.01); *Y02T 10/22* (2013.01)

(58) Field of Classification Search
CPC . B01J 23/42; B01J 23/44; B01J 23/464; B01J 23/50; B01J 23/63; B01J 37/0228; B01J 37/0238; B01J 37/0244; B01J 37/08; B01J 27/224; B01J 35/04
USPC .......................................................... 60/299
See application file for complete search history.

(56) References Cited

U.S. PATENT DOCUMENTS

| | | | | |
|---|---|---|---|---|
| 2004/0077494 | A1* | 4/2004 | LaBarge | B01D 53/945 |
| | | | | 502/303 |
| 2006/0003098 | A1* | 1/2006 | Rashed | C04B 35/573 |
| | | | | 427/228 |
| 2009/0056314 | A1* | 3/2009 | Gabe | B01D 53/9409 |
| | | | | 60/278 |
| 2013/0243658 | A1* | 9/2013 | Tsukamoto | F01N 3/021 |
| | | | | 422/168 |
| 2016/0193597 | A1* | 7/2016 | Wolff | B01J 37/0244 |
| | | | | 502/65 |
| 2016/0194762 | A1* | 7/2016 | Schaedler | C23C 26/00 |
| | | | | 428/220 |

FOREIGN PATENT DOCUMENTS

| | | |
|---|---|---|
| JP | 1-127045 A | 5/1989 |
| JP | 10-85604 A | 4/1998 |

OTHER PUBLICATIONS

International Search Report dated Dec. 11, 2015 in PCT/EP2015/073312 filed Oct. 8, 2015.
French Search Report dated Jun. 22, 2015 in FR1459732 filed Oct. 10, 2014.

* cited by examiner

DEVICE FOR CATALYTIC CONVERSION HAVING A REDUCED ACTIVATION TIME

TECHNICAL FIELD AND PRIOR ART

This invention relates to a device for catalytic conversion having a reduced activation time, intended for the depollution of gases, in particular the depollution of exhaust gases of a motor vehicle.

Internal combustion engines, in particular diesel engines, produce exhaust gases containing nitrogen oxides, routinely referred to as NOx, mainly composed of nitrogen monoxide NO and carbon monoxide CO.

We are looking to reduce these polluting emissions.

Depollution systems are provided on the exhaust line to treat the exhaust gases, in particular to reduce NOx into $N_2$ and oxidise CO into $CO_2$.

One example of a depollution system includes a NOx trap. This trap comprises a reduction catalyst under diesel conditions, which requires the periodic supply of reducing agents via the engine (by post-injection of fuel), and generates a 60% to 70% reduction of NO, however causes an additional consumption of 2 g/km of $CO_2$.

This trap operates via successive alternations in lean and rich operating modes, the first phase corresponding to the storage of the NOx in the gaseous effluents at the engine outlet, the second phase corresponding to their reduction.

The NOx trap comprises a support, generally formed from a mixture of alumina, ceria or zirconia, onto which are successively deposited an alkaline or alkaline earth oxide, for example Ba or Sr, followed by precious metals, for example platinum or rhodium. Rhodium is mainly used for the reduction reaction of the nitrogen oxides whereas Platinum and Palladium are active in the oxidation of CO and hydrocarbons.

However, although the catalytic oxidation of the pollutants is not difficult within the highly-oxidising gaseous flow exiting the Diesel engine, the reduction of NOx into $N_2$ in such an environment is incomplete.

Other traps exist and comprise a support made from SiC covered with precious metals forming catalysts. SiC offers the advantage of having good thermal conductivity, which allows the catalysts to quickly rise in temperature, said catalysts being active for temperatures between about 150° C. and 600° C., the temperature rise being a result of the heat of the exhaust gases. However, this good thermal conductivity has the disadvantage of also causing a rapid drop in the temperature of the catalyst support. Moreover, SiC is a fragile, expensive material.

Catalytic converters exist as described in the document U.S. Pat. No. 6,986,247, comprising a thermoelectric generator for producing electricity from the heat of the exhaust gases and using this electricity to heat the catalysts when the vehicle is cold in order to reduce the activation time of the catalysts. These converters are complex to manufacture, and implement a thermoelectric generator and means for storing the electricity generated by the thermoelectric generator.

DESCRIPTION OF THE INVENTION

Consequently, one purpose of this invention is to offer a device for catalytic conversion having an improved conversion efficiency and simplified manufacture compared to devices of the prior art.

The aforementioned purpose is achieved through a device comprising a support, for example made from ceramic, a layer of thermal insulating material on the support, and a layer of porous SiC on the layer of insulating material and one or more catalysts on the layer of porous SiC.

This manner allows the benefits of the good thermal conductivity of SiC to be obtained without having to manage its fragility as it does not form the support. Thanks to the good thermal conductivity of SiC, the temperature rises quickly at start-up. Moreover, as a result of the thermal insulation between the support and the SiC, the heat is stored in the SiC, which helps maintain the temperature throughout operation or at least slow the temperature drop; the catalysts can therefore be maintained in a state of activation or at a temperature close to activation, thus hastening their reactivation.

Advantageously, the one or more catalysts are deposited by chemical vapour deposition, which offers the advantage of lowering the activation temperature of the one or more catalysts, for example by 15° C.

In other words, a catalytic converter is produced wherein the support is made from a resistant, low-cost material and only one layer of SiC is produced, which ensures the "thermalisation" of the one or more catalysts guaranteeing a faster and more sustainable activation of the latter, which allows for the very fast treatment of the exhaust gases on engine start-up and provides for the continuous or substantially continuous treatment of the gases. Therefore, the quantity of pollutants contained in the exhaust gases effectively discharged into the air is substantially reduced compared to the quantity discharged with devices of the prior art.

The subject-matter of the invention therefore is device for catalytic conversion comprising:
- a ceramic support provided with at least one surface,
- a thermal barrier comprising at least one thermal insulating material covering at least one part of said surface of the support,
- porous SiC at least partially covering the thermal barrier such that the SiC is separated from the support by the thermal barrier,
- one or more conversion catalysts at least on the porous SiC.

The thermal barrier can include at least one layer, said layer being made from at least one of the materials chosen from TiN, YSZ, AlZ, TiAlN.

Advantageously, a buffer layer is inserted between the SiC and the one or more catalysts.

The one or more materials of the buffer layer can be chosen from $CeO_2$, $ZrO_2$, $Al_2O_3$, $BaCO_3$.

The one or more catalysts can be chosen from Pt, Pd, Rh, Ag and a combination of the said metals.

In one advantageous example, the support is made from cordierite or mullite.

The support can comprise channels, the surface of the support being formed by the inner surface of the channels.

The porous SiC advantageously has a porosity between 55% and 70%, preferably between 60% and 65%.

Another subject-matter of the invention is a device for treating the exhaust gases of an internal combustion engine comprising at least one device for catalytic conversion according to the invention.

Another subject-matter of the invention is a method for manufacturing a device for catalytic conversion according to the invention, comprising the following steps:
a) production of a ceramic support,
b) formation of a thermal barrier on at least one part of a surface of said support,
c) formation of porous SiC on at least one part of said thermal barrier, d) formation of one or more conversion catalysts on the SiC.

Step d) advantageously takes place by chemical vapour deposition.

In step d), oxidation catalysts and reduction catalysts can be deposited. The oxidation catalysts and the reduction catalysts are, for example, deposited in different sub-steps.

In step b), a continuous layer of SiC can be formed; said continuous layer then undergoes a porosification step, for example by heating to between 800° C. and 1100° C.

BRIEF DESCRIPTION OF THE FIGURES

This invention shall be better understood after reading the following description with reference to the appended figures, wherein.

DETAILED DESCRIPTION OF THE SPECIFIC EMBODIMENTS

Figure 1:
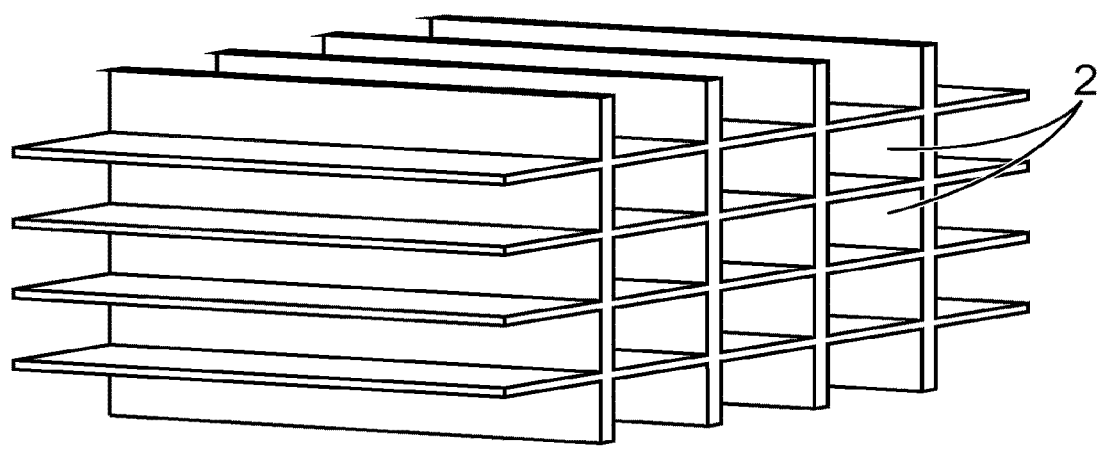
FIG. 1 is a perspective view of one example of a catalytic conversion support according to the invention.

FIG. 1 shows one example of a device for catalytic conversion according to the invention. The device is intended to be arranged in an exhaust duct and passed through by the entire exhaust flow. The device comprises a plurality of channels 2 extending in the direction of the exhaust gas flow. The exhaust gases come into contact with the inner surface of the channels that comprise catalysts resulting in the conversion, for example, of NOx into $N_2$ and of CO into $CO_2$. In the example illustrated, the channels have a square cross-section, however they could have a hexagonal cross-section in order to resemble a honeycomb structure. More generally, the channels have a polygonal cross-section. Furthermore, any other shape allowing for a good level of contact between the gases and the device are suitable.

As a variant, the device could comprise channels, one of whose ends is blanked off. For example a channel, comprising a blanked-off longitudinal end, would be surrounded by channels comprising an opposite longitudinal end that would be blanked off in order to force the gas to pass through the wall of the channels, whereby the latter are porous. This structure results in an increase in the time during which the gases are present in the device, and thus increases the quantity of pollutants converted.

Figure 2:
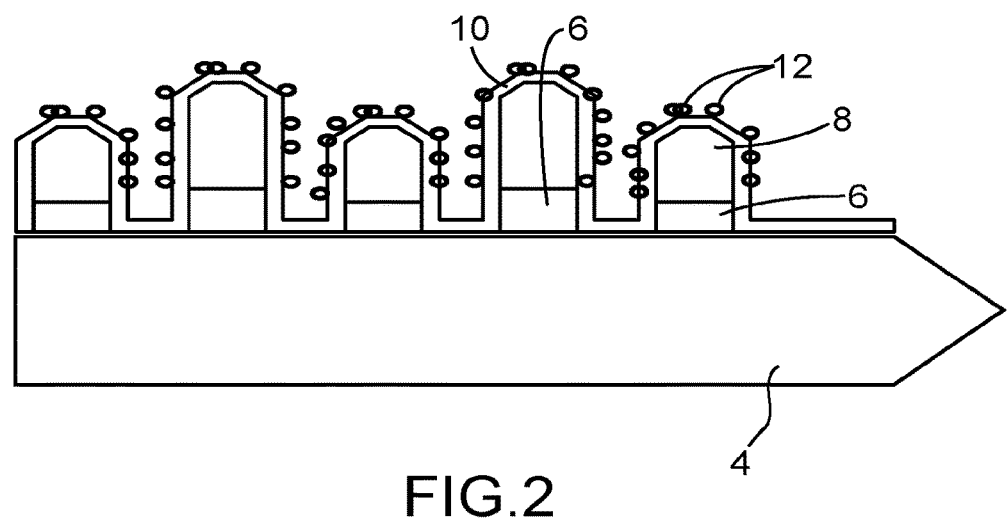
FIG. 2 is a diagrammatic illustration of a cross-sectional view of an area of the device for catalytic conversion in FIG. 1.

FIG. 2 shows a cross-sectional view of the wall of a channel 2 illustrated diagrammatically.

The device comprises a support 4 made from a ceramic material such as mullite, cordierite or isotropic ceramic; the support forms the framework of the device and comprises a plurality of channels parallel to each other. The support is, for example, made from a porous material with a porosity between 30% and 70%.

The ceramic of the support is chosen such that it is less fragile than SiC and advantageously has a lower cost price than SiC. Moreover, the material of the support 4 is electrically and thermally insulating.

Mullite and cordierite have a low thermal conductivity of less than 1 W/m·K.

The device comprises a thermal barrier 6 on the support 4, the thermal barrier 6 comprising one or more thermal insulating materials 6, said thermal insulating materials at least partially covering the support 4. The thermal barrier 6 can comprise one or more layers of thermal insulating materials.

The device further comprises porous $Si_xC_y$ 8, where $0<x<1$ and $0<y<1$, on the material 6, a buffer layer 10 also referred to as a "wash-coat" on the $Si_xC_y$, and one or more catalysts 12 on the buffer layer 10, intended to be in contact with the exhaust gases.

For simplicity purposes, the $Si_xC_y$ will hereafter be referred to as SiC.

The porosity of the SiC provides a large extended surface allowing either the size of the support to be reduced while maintaining the same surface area of the SiC, or the surface area of the SiC to be increased, while maintaining the same support size. Moreover, the porous SiC has a structure that causes the exhaust gas flow to swirl, which improves the contacts between the gases and the catalysts and eases the conversion reactions. The structure of the porous SiC can be fine enough to form a nanostructure. The SiC has an effective porosity. It is, for example, between 55% and 70%, preferably between 60% and 65%, determined by the BET method (Brunauer-Emmett-Teller theory).

The one or more materials forming a thermal barrier 6, for example formed from one or more layers, are chosen, for example, from TiN, YSZ, AlZ (mixture of $Al_2O_3$ and $ZrO_2$ with 5% and 30% $ZrO_2$), or TiAlN. The one or more materials forming the thermal barrier have a thermal conductivity preferably less than 10 W/m·K. The YSZ has the advantage of stopping cracks within the material.

In the example illustrated, the thermal barrier 6 is discontinuous. This discontinuity can be a result of the heterogeneous nature of the support. A device in which the thermal barrier covers the support in a continuous manner does not fall outside of the scope of this invention.

The buffer layer 10 is, for example, made from $CeO_2$, $ZrO_2$, $Al_2O_3$, or $BaCO_3$.

The one or more catalysts 12 are, for example, chosen from Pt, Pd, Rh, Agora combination of the latter.

Preferably, the one or more catalysts are selectively deposited on the SiC.

It should be noted that Pt and Pd are preferably used to oxidise the CO into $CO_2$ and Rh is preferably used to reduce the NOx into $N_2$.

For the purposes of illustration, the support has a thickness between 1 and 2 mm, the thermal barrier layer has a thickness between 20 μm and 250 μm, preferably about 150 μm+/−20 μm, the porous SiC layer has a thickness between 1 μm and 50 μm, preferably between 5 and 10 μm and the catalyst layer that can be discontinuous has a thickness between 4 and 12 nm.

The paragraphs below will now describe the operating mode of the device for catalytic conversion. This mode is described with reference to the conversion of NOx into $N_2$.

For example, the device is arranged in an exhaust duct. On start-up of the combustion engine, the device, and in particular the catalysts are cold, are thus not activated and are incapable of converting NOx into $N_2$.

The hot exhaust gases come into contact with the surface of the device, which is cold; however, due to the good thermal conductivity of SiC, its temperature rises quickly, all the more so as the thermal barrier 6 limits the thermal losses at the level of the support. The SiC therefore radiates the heat towards the catalysts, which therefore quickly heat up and quickly become activated. They are ready to convert the NOx contained in the exhaust gases into $N_2$. The activation temperature is between about 150° C. and 600° C.

Moreover, the porous SiC forms thermal reservoirs as it is thermally insulated from the support. It therefore forms a source of available heat for the catalysts, maintaining them at a temperature close to the activation temperature, or even at the activation temperature. Consequently, the interim catalyst activation periods during the shutdown/start-up phases are shortened, resulting in a substantially continuous depollution of the exhaust gases.

This results in a reduction, or even elimination of the NOx discharged into the air.

One method for manufacturing the device according to the invention will now be described.

During a first step, a ceramic support, for example made from cordierite or mullite is produced. The support has the general shape shown in FIG. 1 for example.

During a subsequent step, the thermal barrier 6 is formed on the support.

During a subsequent step, the porous SiC is formed on the thermal barrier. Advantageously, a layer of continuous SiC is initially deposited; this layer then undergoes porosification. The layer of SiC is, for example, made by coating, for example using a polysiloxane. This layer is then heated, for example between 800° C. and 1100° C., which makes the layer porous.

During a subsequent step, the wash-coat is formed, for example by impregnation.

During a subsequent step, the one or more catalysts are deposited onto the wash-coat.

Preferably, the catalysts are deposited by chemical vapour deposition or CVD, and preferably in a selective manner on the SiC.

The deposition by CVD on the porous SiC has the advantage of reducing the quantity of catalyst necessary, as the deposition takes place selectively on the SiC. Indeed, the deposition of the catalysts on the SiC takes place at a lower temperature than on the cordierite; therefore by heating the SiC to a sufficient temperature to ensure the deposition of catalyst on the SiC only, a deposition is obtained wherein catalysts are deposited on the SiC only. This reduction of the required quantity of catalyst is even more advantageous because it generally involves precious metals. The required quantity of catalysts can be reduced by up to 50%. CVD takes place, for example, at a temperature between 300° C. and 400° C. In order to perform the CVD, the object on which the deposition is to be made is heated, for example by radiation and is then placed in contact with a gaseous mixture containing a precursor of said metal to be deposited or precursors of said metals to be deposited and/or of their alloys.

As stipulated hereinabove, Pt and Pd are preferably used to oxidise the CO into $CO_2$ and Rh is preferably used to reduce the NOx into $N_2$.

Preferably, the devices for catalytic conversion comprise both oxidation catalysts and reduction catalysts.

Preferably, the deposition of catalysts takes place in two sub-steps:

For example, during a first sub-step, the one or more oxidation catalysts are deposited, for example Pt and/or Pd, and during a second sub-step, the one or more reduction catalysts are deposited, for example Rh. This order is not limiting and the reduction catalysts can be deposited before the oxidation catalysts.

Thanks to the invention, the catalysts are activated more quickly. For example, taking into consideration the NEDC (New European Driving Cycle), wherein the catalysts undergo cold-start testing, in a device of the prior art, the catalysts take around 1 min from a cold start to be activated, whereas in a device according to the invention, this activation time is reduced by 5 s to 20 per cycle. Moreover, the catalysts can be continuously or substantially continuously activated, thus improving the depollution of the gases. Furthermore, the swirls generated by the nanostructure of the surfaces of the conversion device further promote the conversion of the pollutants.

For example, with regard to the depollution methods in the diesel motors requiring the injection of fuel for the reduction catalysts, the device according to the invention avoids the need for said injection and thus generates a saving in the quantity of $CO_2$ emitted.

Moreover, the structure of the device according to the invention allows the quantity of precious metals by CVD to be reduced, and also results in a catalyst activation temperature that is reduced by about 15° C., which provides for even faster activation of the catalysts.

The catalysts deposited by CVD on the porous SiC have a faceted structure which makes them more active, and a structure of a controlled size, for example between 4 and 12 nm. This produces an optimum yield between the material used and the active material.

A device for the catalytic conversion of CO only or of NOx only does not fall outside of the scope of this invention.

Furthermore, the invention applies to the catalytic conversion of any substance, whereby the one or more catalysts are chosen to suit the one or more substances to be converted.

Moreover, the invention is not limited to exhaust gas conversion devices for motor vehicles, but to any system producing gases requiring treatment.

The invention claimed is:

1. A device for catalytic conversion comprising:
   a ceramic support including at least one surface;
   a thermal barrier made from at least one thermal insulating material covering at least one part of the surface of the support, the thermal barrier having a thermal conductivity less than 10 W/m·K;
   porous SiC at least partially covering the thermal barrier such that the SiC is separated from the support by the thermal barrier;
   one or more conversion catalysts at least on the porous SiC.

2. The device for catalytic conversion according to claim 1, wherein the thermal barrier includes at least one layer, the layer being made from at least one of materials chosen from TiN, YSZ, AlZ, TiAlN.

3. The device for catalytic conversion according to claim 1, further comprising a buffer layer inserted between the SiC and the one or more conversion catalysts.

4. The device for catalytic conversion according to claim 3, wherein the buffer layer is made of at least one material chosen among $CeO_2$, $ZrO_2$, $Al_2O_3$, $BaCO_3$.

5. The device for catalytic conversion according to claim 1, wherein the one or more conversion catalysts are chosen from Pt, Pd, Rh, Ag or a combination of the metals.

6. The device for catalytic conversion according to claim 5, wherein the porous SiC has a porosity between 55% and 70%.

7. The device for catalytic conversion according to claim 6, wherein the porous SiC has a porosity between 60% and 65%.

8. A device for treating the exhaust gases of an internal combustion engine comprising the at least one device for catalytic conversion according to claim 5.

9. A method for manufacturing the device for catalytic conversion according to claim 5, comprising:

a) production of a ceramic support,
b) formation of a thermal barrier on at least one part of a surface of the ceramic support;
c) formation of porous SiC on at least one part of the thermal barrier;
d) formation of one or more conversion catalysts on the porous SiC.

10. The method of manufacture according to claim 9, wherein d) takes place by chemical vapour deposition.

11. The method of manufacture according to claim 10, wherein in b), a continuous layer of SiC is formed; the continuous layer then undergoes a porosification.

12. The method of manufacture according to claim 11, wherein during the porosification, a heating to between 800° C. and 1100° C. takes place.

13. The method of manufacture according to claim 9, wherein in d), the one or more conversion catalysts are deposited, and wherein the one or more conversion catalysts are deposited in different sub-operations.

14. The device for catalytic conversion according to claim 1, wherein the support is made from cordierite or mullite.

15. The device for catalytic conversion according to claim 1, wherein the support comprises channels, the at least one surface of the support being formed by an inner surface of the channels.

* * * * *